United States Patent
Gerke et al.

(10) Patent No.: US 8,220,356 B2
(45) Date of Patent: Jul. 17, 2012

(54) ANTI-SEPARATION DEVICE FOR USE WITH ISOLATOR

(75) Inventors: Jonathon J. Gerke, Fort Wayne, IN (US); Wade A. Norden, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 1141 days.

(21) Appl. No.: 12/060,962

(22) Filed: Apr. 2, 2008

(65) Prior Publication Data

US 2009/0249917 A1 Oct. 8, 2009

(51) Int. Cl.
*B62D 1/20* (2006.01)
*F16D 3/00* (2006.01)
(52) U.S. Cl. ............................. 74/496; 464/93
(58) Field of Classification Search ............... 180/78; 74/492, 493, 496, 497; 280/779; 403/75, 403/92–96, 98, 99, 170
See application file for complete search history.

(56) References Cited

U.S. PATENT DOCUMENTS

| | | | | |
|---|---|---|---|---|
| 2,499,093 A | * | 2/1950 | Webb | 464/94 |
| 3,317,253 A | * | 5/1967 | Ritterskamp et al. | 384/510 |
| 3,793,849 A | * | 2/1974 | Downey | 464/93 |
| 5,050,443 A | * | 9/1991 | Stocker | 74/492 |
| 6,135,224 A | | 10/2000 | Thomas et al. | |
| 7,316,418 B2 | * | 1/2008 | Goto et al. | 280/779 |
| 2005/0223838 A1 | * | 10/2005 | Higashino et al. | 74/492 |
| 2009/0249917 A1 | * | 10/2009 | Gerke et al. | 74/496 |

FOREIGN PATENT DOCUMENTS

JP 2001199352 7/2001

OTHER PUBLICATIONS

Borgeson Universal Online Store; Ragjoint 13/16-36; http://www.borgeson.com/Merchant2/merchant.mv?.

* cited by examiner

*Primary Examiner* — Thomas R Hannon
*Assistant Examiner* — Alan Waits
(74) *Attorney, Agent, or Firm* — Jeffrey P. Calfa; Mark C. Bach

(57) ABSTRACT

An anti-separation device for use with an isolator that couples a steering input shaft and a steering gear connector includes a retaining plate and a retaining formation. The retaining plate is coupled to the steering gear connector and is configured to displace with and torque with the steering gear connector. The retaining formation is coupled to the steering input shaft and is configured to displace with and torque with the steering input shaft. When the isolator fails and the steering input shaft displaces or rotates relative to the steering gear connector, the retaining plate limits the relative displacement or rotation of the retaining formation and couples the steering input shaft to the steering gear connector.

6 Claims, 2 Drawing Sheets

ANTI-SEPARATION DEVICE FOR USE WITH ISOLATOR

FIELD OF THE INVENTION

The present invention relates generally to automotive vehicles, and more particularly, to anti-separation devices for use with isolators on a steering shaft.

BACKGROUND OF THE INVENTION

An automotive vehicle typically includes a steering shaft and a steering gear coupled to the steering shaft. A steering wheel is typically located at a first end of the steering shaft, and the steering gear is attached to the second end of the steering shaft. The automotive steering shaft is intended primarily for connecting the steering wheel to the steering mechanism by transferring the driver's input torque from the steering wheel to the steering gear. However, the steering shaft can have other functions such as energy dissipation management in the event of a frontal collision, providing mounting for gauges and instruments, and providing height and length adjustment to the driver.

One issue with the steering shaft is that the connection of the steering shaft to the steering gear, and in particular the driver's torque on the steering wheel being mechanically translated to the movement of the steering gear, results in vibration and noise. The vibration and noise typically travels up the steering shaft and is experienced by the driver.

To address the vibration and noise, rubber steering isolators have been placed onto the steering shaft, linking the shaft to the steering gear. However, a problem with the prior art rubber isolators is that they can fail, resulting in the separation of the steering shaft from the steering gear and a total loss of steering.

SUMMARY OF THE INVENTION

An anti-separation device for use with an isolator that couples a steering input shaft and a steering gear connector includes a retaining plate and a retaining formation. The retaining plate is coupled to the steering gear connector and is configured to displace with and torque with the steering gear connector. The retaining formation is coupled to the steering input shaft and is configured to displace with and torque with the steering input shaft. When the isolator fails and the steering input shaft displaces or rotates relative to the steering gear connector, the retaining plate limits the relative displacement or rotation of the retaining formation and couples the steering input shaft to the steering gear connector.

DESCRIPTION OF A PREFERRED EMBODIMENT

Figure 1:
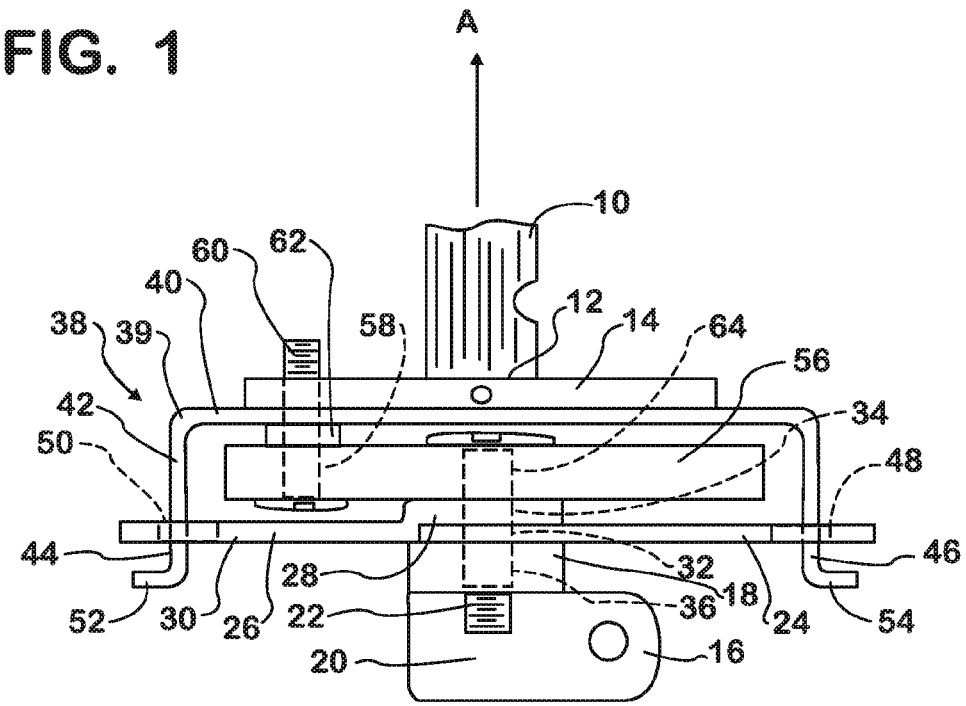
FIG. 1 is a schematic of an anti-separation device for use with an isolator in accordance with the invention.
Figure 2:
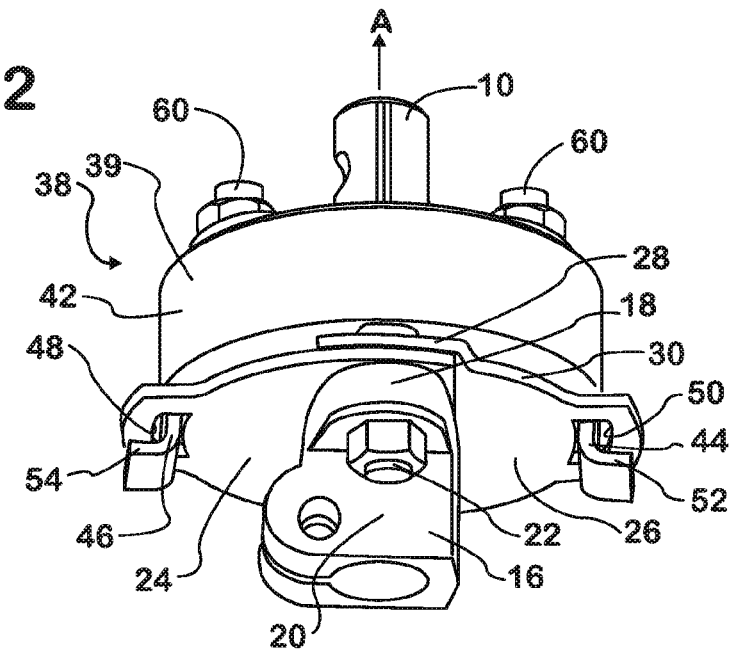
FIG. 2 is a perspective view of the anti-separation device for use with an isolator in accordance with the invention.

Referring to FIGS. 1 and 2, an input steering shaft 10 having an axis "A" has a first end (not shown) that is attached to a steering wheel (not shown), and a second end 12 attached to an attachment plate 14. The attachment plate 14 is generally perpendicular to the axis "A".

A steering gear connector 16 is coupled to the input steering shaft 10 and has a first portion 18 offset from the axis "A" and a second portion 20 generally aligned with the axis "A". The first portion 18 is configured for receiving a first fastener 22, advantageously a button head screw, although other fasteners are contemplated. The second portion 20 is configured for attachment to a steering gear (not shown).

Adjacent to the steering gear connector 16 is at least one retaining plate, preferably in the form of a first plate 24 and a second plate 26 each having a generally semi-circular shape that extends radially from the axis "A". The second plate 26 has an overlapping portion 28 that overlaps the first plate 24, and a co-planar portion 30 that generally lays in the same plane as the first plate. The first plate 24 has a first receiving hole 32, the second plate 26 has a second receiving hole 34 at the overlapping portion 28, and the first portion 18 of the steering gear connector 16 has a third receiving hole 36.

Adjacent to the attachment plate 14, an anti-separation device 38 includes a generally cup-shaped member 39 having a first surface 40 that is generally parallel to the attachment plate and generally perpendicular to axis "A", and a second generally cylindrical surface 42. The anti-separation device 38 also includes the first plate 24 and the second plate 26.

The second generally cylindrical surface 42 extends from the first surface 40 generally concentrically with the axis "A" towards the first plate 24 and the second plate 26. At least one retaining formation, and advantageously first and second legs 44, 46, extend from the second surface 42 through a first retaining hole 48 in the first plate 24 and a second retaining hole 50 in the second plate 26, respectively. The first retaining hole 48 and the second retaining hole 50 are advantageously oversized with respect to the first and second legs 44, 46. At the end of the first leg 44 and the second leg 46, a first foot 52 and a second foot 54, each extend radially with respect to the axis "A".

Located adjacent the second plate 26 and within the anti-separation device 38, an isolator 56 couples the input steering shaft 10 to the steering gear connector 16. The isolator 56 has an attachment hole 58 for receiving a second fastener 60, which attaches the isolator to the anti-separation device 38 and the attachment plate 14 of the input steering shaft 10. A spacer 62 is disposed between the isolator 56 and the anti-separation device 38. The second fastener 60 is advantageously a button head screw, however other types of fasteners are contemplated. The spacer 62 provides space between the isolator 56 and the cup-shaped member 39 to allow the isolator to wobble without contacting the cup-shaped member.

The isolator 56 has a fourth receiving hole 64. The first receiving hole 32, the second receiving hole 34, the third receiving hole 36 and the fourth receiving hole 64 receive the first fastener 22. In this configuration, the isolator 56 is coupled to the steering gear connector 16.

When the steering wheel (not shown) is torqued, the input steering shaft 10 and the attachment plate 14 are also torqued. The torque is transmitted through the second fastener 60 to the isolator 56, which transmits the torque to the first fastener 22, the first plate 24, the second plate 26, and the steering gear connector 16. Under this normal operating circumstance, the first and second legs 44, 46 do not contact their respective oversized retaining holes 48, 50.

The isolator 56 is advantageously formed of rubber having about a half-inch thickness and about a 3-inch diameter, however other materials and dimensions are contemplated. The anti-separation device 38 is advantageously formed of steel sheeting having a 2-3 millimeter thickness, however other materials and thicknesses are contemplated.

Should the isolator 56 fail to the extent that it is unable to transmit the torque from the input steering shaft 10 to the steering gear connector 16, the anti-separation device 38 provides a secondary coupling of the input steering shaft to the steering gear connector. The torquing of the input steering shaft 10 is transmitted to the first surface 40 of the anti-separation device 38 with the first fastener 22. As the first and second legs 44, 46 torque slightly with respect to the plates 24, 26, the legs engage the retaining holes 48, 50, and the torque is transmitted through the first and second plates 24, 26 and to the steering gear connector 16. The first and second legs 44, 46 are configured to prevent or limit relative torsional movement between the input steering shaft 10 and the steering gear connector 16. Further, the first foot 52 and the second foot 54 of the anti-separation device 38 are configured to prevent or limit the relative displacement of the input steering shaft 10 with respect to the steering gear connector 16 along the axis "A".

Figure 3:
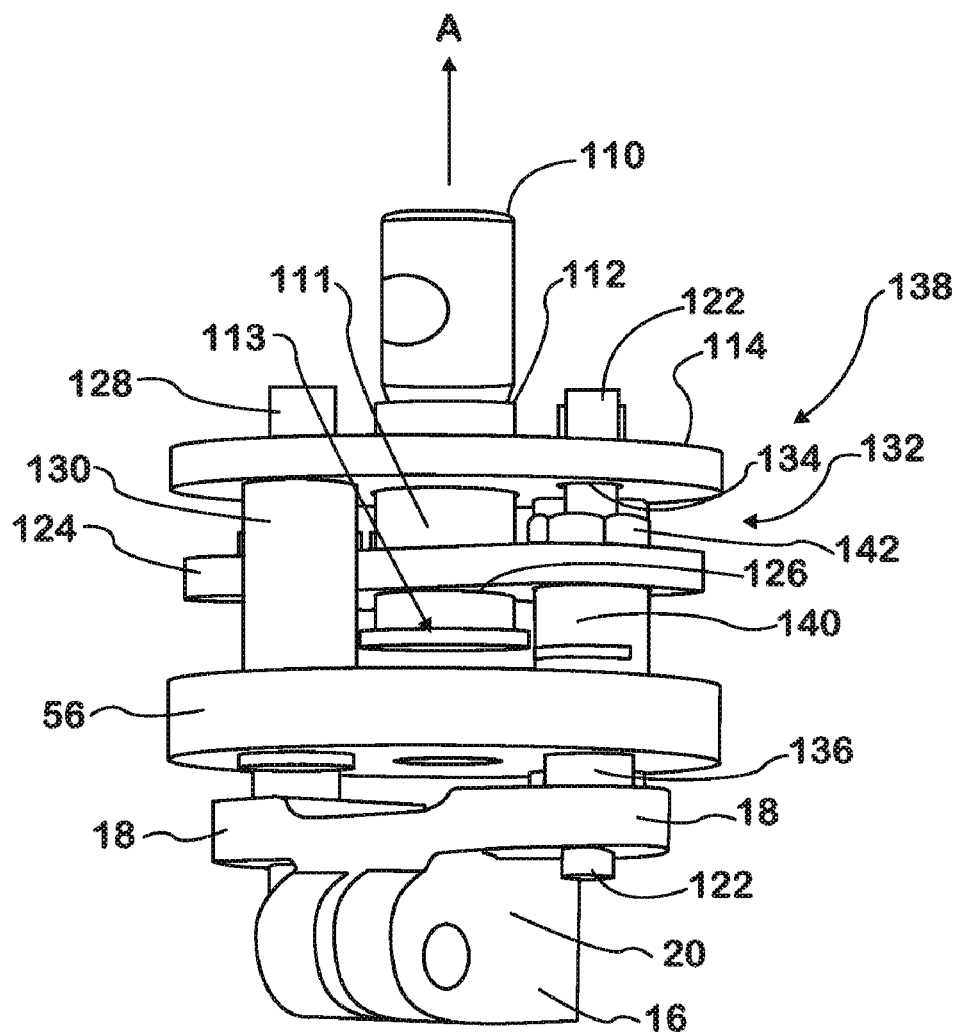
FIG. 3 is a perspective view of a second embodiment of an anti-separation device for use with an isolator.

Referring now to FIG. 3, a second embodiment of anti-separation device will be shown and described. An input steering shaft 110 having an axis "A" has a first end (not shown) that is attached to a steering wheel (not shown), and a second end 112 attached to an attachment plate 114. The attachment plate 114 is generally perpendicular to the axis "A". On the opposite side of the attachment plate 114 from the input steering shaft 110 is a secondary shaft 111 that is aligned with axis "A". At the distal end of the secondary shaft 111 is a retaining formation 113, advantageously a lip.

The steering gear connector 16 is coupled to the input steering shaft 110 and has the first portion 18 offset from the axis "A" and the second portion 20 generally aligned with the axis "A". The first portion 18 is configured for receiving a first pin 122, and the second portion 20 is configured for attachment to a steering gear (not shown).

Disposed axially between the input steering shaft 110 and the steering gear connector 16 is a retaining plate 124 having a generally rectangular shape and a central receiving hole 126. The secondary shaft 111 is received in the central receiving hole 126.

The attachment plate 114 is bolted to the isolator 56 with a bolt 128. A spacer 130 is disposed on the bolt 128 between the isolator 56 and the attachment plate 114. A pin assembly 132 pins the steering gear connector 16 to the isolator 56 and to the retaining plate 124 with the pin 122. The attachment plate 114 includes a pin-receiving hole 134 that is over-sized with respect to the pin 122. The pin 122 extends up through the over-sized pin-receiving hole 134. A second spacer 136 is disposed between the steering gear connector 16 and the isolator 56, and a third spacer 140 is disposed between the isolator and the retaining plate 124. The retaining plate 124 is bolted to the third spacer 140 with a bolt 142. Together, the secondary shaft 111 having the retaining formation 113, the retaining plate 124, and the pin assembly 132 form an anti-separation device 138.

When the steering input shaft 110 is torqued, the torque is transmitted through the attachment plate 114 through the bolt 128 and to the isolator 56. From the isolator 56, the torque is transmitted to the steering gear connector 16 through the pin 122 at the second spacer 136.

Should the isolator 56 fail to the extent that it is unable to transmit the torque from the input steering shaft 110 to the steering gear connector 16, a secondary coupling of the input steering shaft to the steering gear connector is provided. When the isolator 56 fails, the torquing of the input steering shaft 110 causes the oversized receiving hole 134 to rotate slightly with respect to the pin 122 until the receiving hole contacts the pin. When this contact occurs, the torque is transmitted through the pin 122 to the steering gear connector 16.

In the event that the isolator 56 fails, and since the connection between the input gear shaft 110 and the steering gear connector 16 is pinned, there is a tendency for the input gear shaft to displace generally axially away from the steering gear connector. The anti-separation device 138 limits or prevents the displacement of the steering gear shaft 110. When the secondary shaft 111 displaces relative to the retaining plate 124 through the central receiving hole 126, the retaining formation 113 prevents further displacement through the central receiving hole. Specifically, the lip cannot displace through the central receiving hole 126. Advantageously, the length of permitted displacement is less than the supplemental length of the pin 122 such that the attachment plate 114 remains torsionally coupled to the steering gear connector 16 with the pin.

With the anti-separation devices 38, 138, when the isolator 56 fails, there is not a total loss of steering. Instead, some steering capabilities remain as the torque is transmitted from the steering input shaft 10 through the retaining formation 44, 46 to the retaining plate 24, 26 and to the steering gear connector 16 in the anti-separation device 38, and from the steering input shaft 110 through the pin assembly 132 to the steering gear connector 16 in the anti-separation device 138.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An anti-separation device for use with an isolator that couples a steering input shaft having an axis and a steering gear connector, comprising:

a first retaining plate perpendicular to the axis, and a second retaining plate perpendicular to the axis, the first and second retaining plates coupled to the steering gear connector and configured to displace with and torque with the steering gear connector, the first retaining plate and the second retaining plate each having at least one retaining hole through the first retaining plate and the second retaining plate, at least a portion of the first retaining plate and the second retaining plate being coplanar in a plane that is perpendicular to the axis;

a cup-shaped member having a first surface that is perpendicular to the axis, and a second surface that is cylindrical and parallel with the axis, wherein the member is coupled to the input steering shaft and is configured to torque with the input steering shaft, wherein the member, the first retaining plate and the second retaining plate are configured to substantially enclose the isolator;

a fisrt leg extending from the second surface in a direction parallel to the axis and received by the at least one retaining hole through the first retaining plate, and a second leg extending from the second surface in a direction parallel to the axis and received by the at least one retaining hole through the second retaining plate, wherein the first leg and the second leg are coupled to both the steering input shaft and the steering gear connector;

wherein when the isolator fails and the steering input shaft displaces or rotates relative to the steering gear connector, the first retaining plate and the second retaining plate limits the relative displacement or rotation of the retaining formation and couples the steering input shaft to the steering gear connector; and the first retaining plate and the second retaining plate each have a semi-circular shape, and wherein the first retaining plate and the second retaining plate each have an overlapping portion and a coplanar portion, wherein the coplanar portion of the first retaining plate is coplanar with the coplanar portion of the second retaining plate.

2. An anti-separation device for coupling a steering input shaft having an axis and a steering gear connector, comprising:

a first retaining plate perpendicular to the axis, and a second retaining plate perpendicular to the axis, the first and second retaining plates coupled to the steering gear connector and configured to displace with and torque with the steering gear connector, the first retaining plate and the second retaining plate each having at least one retaining hole through the first retaining plate and the second retaining plate, at least a portion of the first retaining plate and the second retaining plate being coplanar in a plane that is perpendicular to the axis;

a member having a first surface that is perpendicular to the axis, and a second surface that is cylindrical and parallel with the axis, wherein the member is coupled to the input steering shaft and is configured to torque with the input steering shaft, wherein the member, the first retaining plate and the second retaining plate are configured to substantially enclose the isolator;

a first leg extending from the second surface in a direction parallel to the axis and received by the at least one retaining hole through the first retaining plate, and a second leg extending from the second surface in a direction parallel to the axis and received by the at least one retaining hole through the second retaining plate, wherein the first leg and the second leg are coupled to both the steering input shaft and the steering gear connector;

an isolator fastened to the first retaining plate and the second retaining plate, and also fastened to the member;

wherein when the isolator fails and the steering input shaft displaces or rotates relative to the steering gear connector, the first retaining plate and the second retaining plate limits the relative displacement or rotation of the retaining formation and couples the steering input shaft to the steering gear connector; and the second plate has an overlapping portion that overlaps the first plate, and a coplanar portion that lays in the same plane as the first plate.

3. The anti-separation device of claim 2 wherein the first leg and the second leg further comprise a first foot and a second foot extending radially from the steering input shaft axis.

4. The anti-separation device of claim 2 wherein the first retaining hole and the second retaining hole are oversized with respect to the first leg and the second leg.

5. The anti-separation device of claim 2 wherein the first plate and the second plate each have a semi-circular shape extending radially from the steering input shaft axis.

6. The anti-separation device of claim 2 wherein the member is cup-shaped.

* * * * *